US012566831B2

(12) United States Patent
Blouet et al.

(10) Patent No.: US 12,566,831 B2
(45) Date of Patent: Mar. 3, 2026

(54) METHODS AND SYSTEMS FOR TRAINING A MACHINE LEARNING MODEL AND AUTHENTICATING A USER WITH THE MODEL

(71) Applicant: Daon Technology, Dublin (IE)

(72) Inventors: Raphael Blouet, Talence (FR); Ana Mantecon, Madrid (ES)

(73) Assignee: Daon Technology, Douglas (IM)

( * ) Notice: Subject to any disclaimer, the term of this patent is extended or adjusted under 35 U.S.C. 154(b) by 335 days.

(21) Appl. No.: 17/529,344

(22) Filed: Nov. 18, 2021

(65) Prior Publication Data

US 2023/0153408 A1     May 18, 2023

(51) Int. Cl.
*G10L 15/00*       (2013.01)
*G06F 21/32*       (2013.01)
(Continued)

(52) U.S. Cl.
CPC ............. *G06F 21/32* (2013.01); *G06N 20/00* (2019.01); *G10L 17/02* (2013.01); *G10L 17/04* (2013.01); *G10L 17/06* (2013.01); *G10L 17/24* (2013.01)

(58) Field of Classification Search
CPC ......... G10L 17/00; G10L 17/02; G10L 17/04; G10L 17/06; G10L 17/10; G10L 17/16;
(Continued)

(56) References Cited

U.S. PATENT DOCUMENTS 5,995,927 A * 11/1999 Li ........................... G10L 17/20
                                 704/E15.01
11,735,158 B1    8/2023 Gupta et al.
(Continued)

FOREIGN PATENT DOCUMENTS

WO    WO-2018197916 A1 * 11/2018 ............. G06F 21/34

OTHER PUBLICATIONS

Sohn, Kihyuk. "Improved deep metric learning with multi-class n-pair loss objective." Advances in neural information processing systems 29 (2016). (Year: 2016).*
Li, Chao, et al. "Deep speaker: an end-to-end neural speaker embedding system." arXiv preprint arXiv:1705.02304 (2017). (Year: 2017).*
Wan, Li, et al. "Generalized end-to-end loss for speaker verification." 2018 IEEE International Conference on Acoustics, Speech and Signal Processing (ICASSP). IEEE, 2018. (Year: 2018).*
(Continued)

*Primary Examiner* — Michael Ortiz-Sanchez
(74) *Attorney, Agent, or Firm* — Kevin McDermott, Esq.

(57) ABSTRACT

A method of training a machine learning model to conduct authentication transactions is provided that includes the steps of obtaining, by an electronic device, a training dataset of audio signals. Each audio signal includes voice biometric data of a user and information for a passphrase spoken by the respective user and belongs to a same or different data class. Each data class includes a user identity and a passphrase identifier. Moreover, the method includes the steps of creating, using a machine learning model being trained, at least one embedding for each audio signal. The machine learning model includes parameters. Furthermore, the method includes calculating, by a machine learning algorithm using the embeddings, a loss, and updating parameters of the machine learning model based on the calculated loss. In response to determining criteria defining an end of training have been satisfied, deeming the machine learning model to be operable for use in simultaneously successfully verifying the identity of a user based on voice biometric data and verifying a passphrase spoken by the user matches a secret passphrase during authentication transactions.

12 Claims, 6 Drawing Sheets

(51) Int. Cl.

| | |
|---|---|
| *G06N 20/00* | (2019.01) |
| *G10L 17/00* | (2013.01) |
| *G10L 17/02* | (2013.01) |
| *G10L 17/04* | (2013.01) |
| *G10L 17/06* | (2013.01) |
| *G10L 17/24* | (2013.01) |

(58) Field of Classification Search

CPC ......... G10L 17/24; G10L 17/22; G06F 21/00; G06F 21/30; G06F 21/31; G06F 21/32; G06N 20/00

See application file for complete search history.

(56) References Cited

U.S. PATENT DOCUMENTS

| | | | |
|---|---|---|---|
| 2007/0129944 | A1 | 6/2007 | Luan et al. |
| 2013/0166296 | A1* | 6/2013 | Scheffer ................. G06F 21/32 704/243 |
| 2013/0179681 | A1* | 7/2013 | Benson ........... G06Q 20/38215 713/155 |
| 2021/0304775 | A1* | 9/2021 | van den Berg .. G06Q 20/40145 |
| 2021/0326757 | A1 | 10/2021 | Rawat et al. |
| 2023/0153408 | A1 | 5/2023 | Blouet et al. |

OTHER PUBLICATIONS

Zhang, Chunlei, and Kazuhito Koishida. "End-to-End Text-Independent Speaker Verification with Triplet Loss on Short Utterances." (2017). (Year: 2017).*

Sigtia et al., "Multi-task Learning for Speaker Verification and Voice Trigger Detection", EE and Systems Science, Jan. 26, 2020, pp. 1-5.

Mun et al., "Robust text dependent speaker verification via character level information preservation for the SdSV challenge 2020", EE & Systems Science, Oct. 22, 20, pp. 1-5.

Tang et al., "Multi-task recurrent model for speech and speaker recognition", Computer Science—Computation and Language, Sep. 27, 16, pp. 1-5.

Chen et al., "Multi-task learning for text-dependent speaker verification", Interspeech 2015, Sep. 2015, pp. 185-189.

Examination Report for related EPO Application No. 22205416.5, dated Jan. 21, 2025, pp. 1-7.

Phan Tuan et al., "Multi-task Learning based Voice Verification with Triplett Loss", Int'l Conf. on MAPR, IEEE, Oct. 8, 2020, pp. 1-6.

Search Report for related EPO Application No. 22205416.5, dated Mar. 20, 2023, pp. 1-9.

Wan Li et al., "Generalized End-to-End Loss for Speaker Verification",2018 IEEEInt'l Conf. on Acoustics Speech and Signal Processing, Apr. 15, 2015, pp. 4879-4883.

* cited by examiner

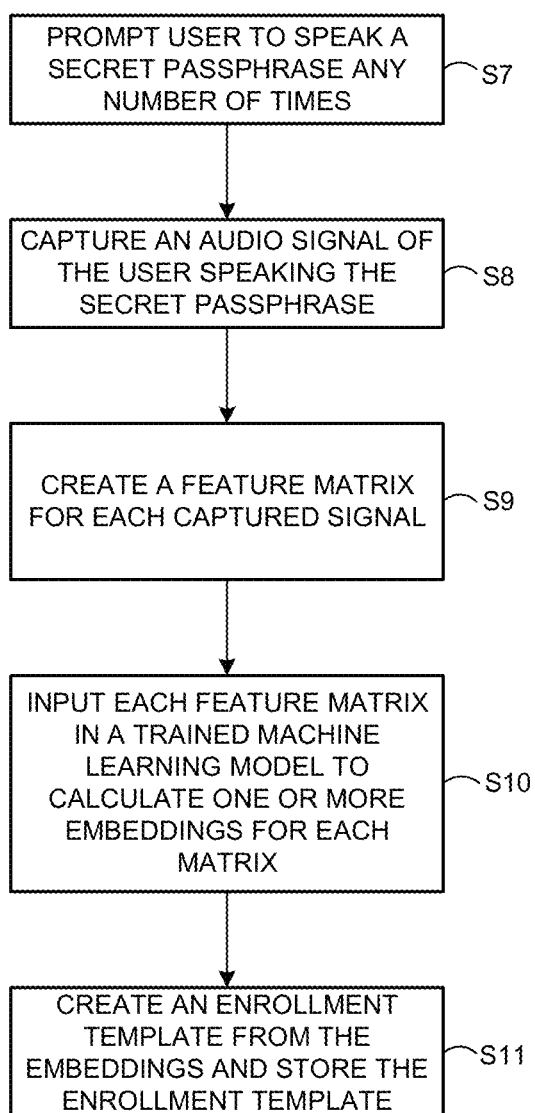

PROMPT USER TO SPEAK A
SECRET PASSPHRASE ANY
NUMBER OF TIMES ⌐S7

CAPTURE AN AUDIO SIGNAL OF
THE USER SPEAKING THE
SECRET PASSPHRASE ⌐S8

CREATE A FEATURE MATRIX
FOR EACH CAPTURED SIGNAL ⌐S9

INPUT EACH FEATURE MATRIX
IN A TRAINED MACHINE
LEARNING MODEL TO
CALCULATE ONE OR MORE
EMBEDDINGS FOR EACH
MATRIX ⌐S10

CREATE AN ENROLLMENT
TEMPLATE FROM THE
EMBEDDINGS AND STORE THE
ENROLLMENT TEMPLATE ⌐S11

FIG. 5

METHODS AND SYSTEMS FOR TRAINING A MACHINE LEARNING MODEL AND AUTHENTICATING A USER WITH THE MODEL

BACKGROUND OF THE INVENTION

This invention relates generally to biometric authentication transactions, and more particularly, to methods and systems for training a machine learning model and authenticating a user with the model.

Users are required to prove who they claim to be during authentication transactions conducted under many different circumstances. For example, users may be required to prove their identity when contacting a call center or a merchant while attempting to remotely purchase a product from a merchant system over the Internet. Claims of identity may be proven during authentication transactions based on audio data captured from the user.

During authentication transactions based on audio data it is known for users to speak or utter a passphrase. The passphrase may be secret or not. Secret passphrases may be specified by the user or by an authentication system and are typically known by only the user. During passive authentication transactions based on audio data, the authentication process can be based on text-independent speech.

A known method of processing a spoken passphrase for an active authentication transaction, is to use a text-dependent automatic speaker verification (TD-ASV) model which is usually defined by a Universal Background Model (UBM) associated with the passphrase. During the enrolment process, the UBM is used to estimate an enrolment template of voice biometric data of a user via Maximum A Posteriori (MAP) adaptation for use in authenticating the user.

A TD-ASV is trained for a specific passphrase. As a result, several TD-ASV models may need to be trained for an authentication system that conducts authentication transactions for different passphrases which requires storing multiple models and increases costs.

A known method of processing a spoken passphrase that allows a user to choose his or her own passphrase includes an enrolment process that includes processing the spoken passphrase by an automatic speech recognition (ASR) model which transcribes the spoken passphrase into a sequence of phonemes which then allows the definition of a Universal Background Model (UBM) that is associated with a passphrase. The UBM is then used to estimate a client enrolment template through MAP adaption for use in authenticating the user.

A known method of processing a spoken passphrase and validating a secret passphrase includes processing the spoken passphrase by a text independent automatic speaker verification (TI-ASV) model to validate the user's identity, and processing the same spoken passphrase by an ASR model to validate the passphrase. The TI-ASV and ASR models are trained separately. During training, the TI-ASV model is calibrated to minimize speaker authentication error, and the ASR model is calibrated to minimize word recognition error. Training TI-ASV and ASR models separately require performing additional calculations which increases the time and costs associated with training.

ASR models are language dependent, so a different ASR model is required for each language used in an authentication system. As a result, several ASR models may need to be trained for an authentication system that conducts authentication transactions in different languages which introduces inefficiencies and increases costs.

In known systems for conducting authentication transactions based on audio data, all users are required to speak the same passphrase so a user is not able to choose his or her own passphrase which compromises security and reduces user convenience. Users are not permitted to choose their own passphrases. Additionally, entities like banks are unable to use different passphrases than competitors.

Thus, it would be advantageous and an improvement over the relevant technology to provide a method, a computer, and a computer-readable recording medium capable of reducing training time and costs, conducting verification transactions that require fewer calculations, eliminating language dependent ASR models and thus the need to store multiple ASR models, and enabling a user to choose his or her own secret passphrase.

BRIEF DESCRIPTION OF THE INVENTION

An aspect of the present disclosure provides method of training a machine learning model to conduct authentication transactions that includes the step of obtaining, by an electronic device, a training dataset of audio signals. Each audio signal includes voice biometric data of a user and information for a passphrase spoken by the respective user and belongs to a same or different data class. Each data class includes a user identity and a passphrase identifier. Moreover, the method includes the steps of creating, using a machine learning model being trained, at least one embedding for each audio signal. The machine learning model includes parameters. Furthermore, the method includes calculating, by a machine learning algorithm using the embeddings, a loss, and updating parameters of the machine learning model based on the calculated loss. In response to determining criteria defining an end of training have been satisfied, deeming the machine learning model to be operable for use in simultaneously successfully verifying the identity of a user based on voice biometric data and verifying a passphrase spoken by the user matches a secret passphrase during authentication transactions.

Another aspect of the present disclosure provides an electronic device for training a machine learning model to conduct authentication transactions. The electronic device includes a processor and a memory configured to store data. The electronic device is associated with a network and the memory is in communication with the processor and has instructions stored thereon which, when read and executed by the processor, cause the electronic device to obtain a training dataset of audio signals. Each audio signal includes voice biometric data of a user and information for a passphrase spoken by the respective user and belongs to a same or different data class. Each data class includes a user identity and a passphrase identifier.

Moreover, the instructions when read and executed by the processor, cause the electronic device to create, using the machine learning model being trained, at least one embedding for each audio signal. The machine learning model includes parameters. Furthermore, the instructions when read and executed by the processor, cause the electronic device to calculate, using the embeddings, a loss, and update parameters of the machine learning model based on the calculated loss. In response to determining criteria defining an end of training have been satisfied, the machine learning model is deemed to be operable for use in simultaneously successfully verifying the identity of a user based on voice biometric data and verifying a passphrase spoken by the user matches a secret passphrase during authentication transactions.

Yet another aspect of the present disclosure provides a non-transitory computer-readable recording medium in an electronic device for training a machine learning model to conduct authentication transactions.

Another aspect of the present disclosure provides a method for authenticating a user and a passphrase including the steps of prompting a user to speak a secret passphrase and capturing, by an electronic device, audio data of the user while speaking a passphrase. The audio data is included in a class of data including a speaker identity and a passphrase identifier. The method also includes the steps of creating a verification template from the captured audio data, comparing the verification template against a corresponding enrolment template of the user, calculating a matching score for the comparison, and comparing the matching score against a threshold score. In response to determining the matching score is at least equal to the threshold score, the method includes the step of simultaneously successfully verifying the identity of the user based on voice biometric data and verifying the passphrase spoken in response to the prompt matches the secret passphrase.

BRIEF DESCRIPTION OF THE DRAWINGS

FIG. 5 is a flowchart illustrating an example method and algorithm for enrolling a user in an authentication system implemented by the computing device according to an embodiment of the present disclosure.

DETAILED DESCRIPTION OF THE INVENTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the example embodiments described herein can be made without departing from the spirit and scope of the present disclosure.

Figure 1:
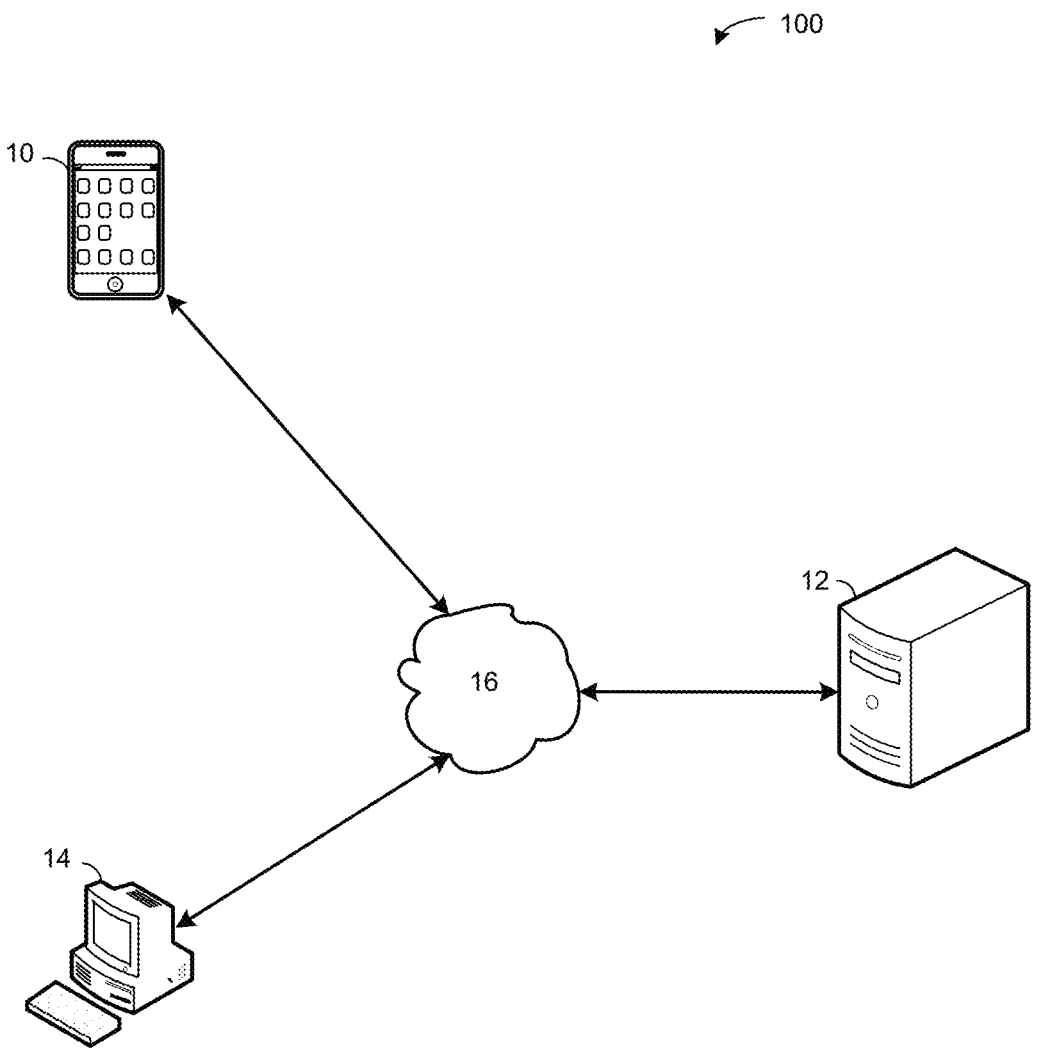
FIG. 1 is a schematic diagram of an example computing system for training a machine learning model and authenticating a user with the model according to an embodiment of the present disclosure.

FIG. 1 is a schematic diagram of an example computing system 100 for training a machine learning model and authenticating a user with the model according to an embodiment of the present disclosure. As shown in FIG. 1, the main elements of the system 100 include a computing device 10, a server 12, and computer 14 communicatively connected via a network 16.

In FIG. 1, the computing device 10 can be any wireless hand-held consumer computing device capable of at least downloading applications over the Internet, running applications, capturing and storing data temporarily and/or permanently, and otherwise performing any and all functions described herein by any computer, computer system, server or computing device included in the system 100. One example of the computing device 10 is a smart phone. Other examples include, but are not limited to, a cellular phone, a tablet computer, a phablet computer, a laptop computer, and any type of hand-held consumer computing device having wired or wireless networking capabilities capable of performing the functions, methods, and/or algorithms described herein.

The computing device 10 is typically associated with a single person who operates the device. The person who is associated with and operates the computing device 10, as well as speaks a passphrase during enrollment and/or an authentication transaction is referred to herein as a user.

The server 12 can be, for example, any type of server or computer implemented as a network server or network computer.

One example of the computer 14 is a personal computer (PC). Other examples include, but are not limited to, a cellular phone, a tablet computer, a phablet computer, a laptop computer, and any type of hand-held consumer computing device having wired or wireless networking capabilities capable of performing the functions, methods, and/or algorithms described herein. The computing device 10, server 12, and computer 14 are electronic devices so each may be alternatively referred to as an electronic device. Additionally, the computing device 10, the server 12, and the computer 14 may each alternatively be referred to as an information system.

The network 16 may be implemented as a 5G communications network. Alternatively, the network 16 may be implemented as any wireless network including, but not limited to, 4G, 3G, Wi-Fi, Global System for Mobile (GSM), Enhanced Data for GSM Evolution (EDGE), and any combination of a LAN, a wide area network (WAN) and the Internet. The network 16 may also be any type of wired network or a combination of wired and wireless networks.

It is contemplated by the present disclosure that the number of computing devices 10, servers 12, and computers 14 is not limited to the number of computing devices 10, servers 12, and computers 14 shown in the system 100. Rather, any number of computing devices 10, servers 12, and computers 14 may be included in the system 100.

Figure 2:
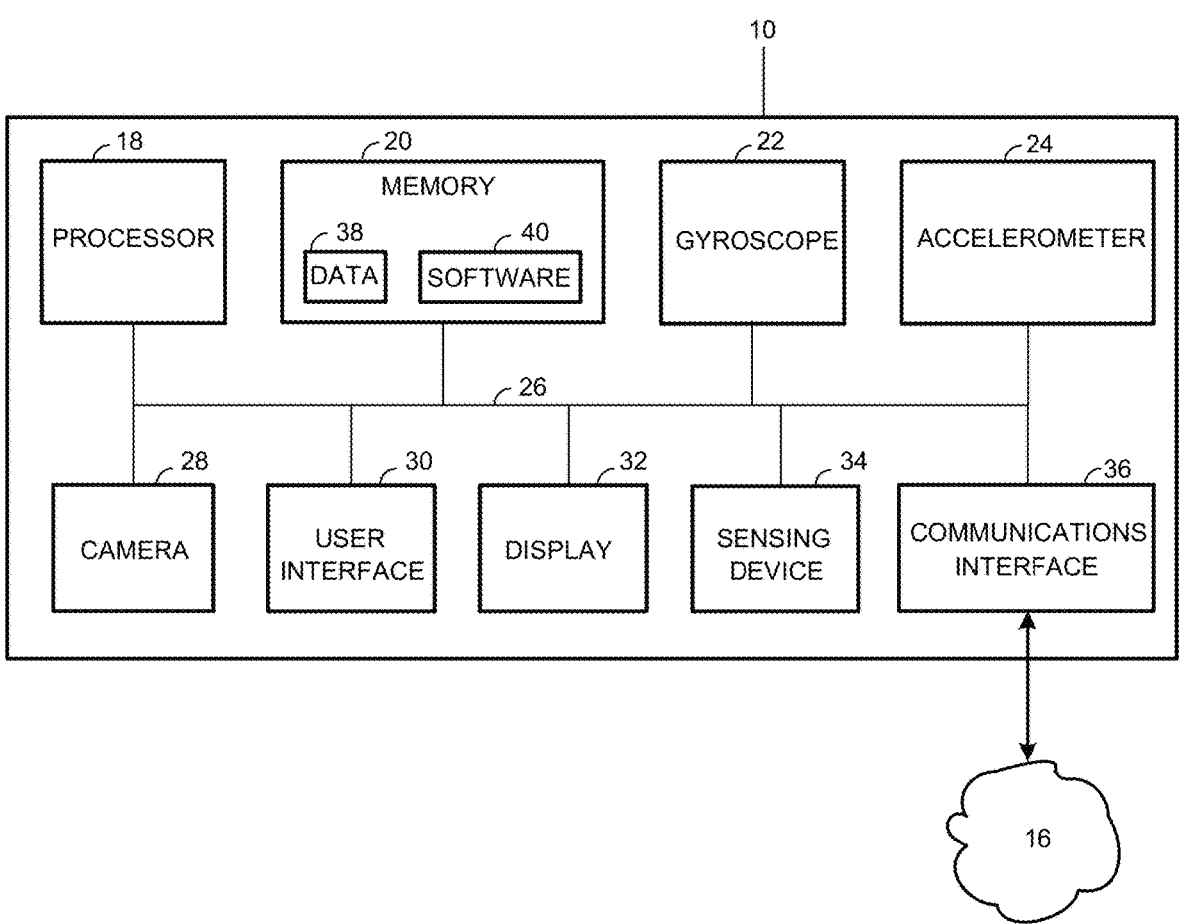
FIG. 2 is a more detailed schematic diagram illustrating a computing device, a server, and a computer in the system of FIG. 1.

FIG. 2 is a more detailed schematic diagram illustrating the computing device 10. The computing device 10 includes components such as, but not limited to, one or more processors 18, a memory 20, a gyroscope 22, an accelerometer 24, a bus 26, a camera 28, a user interface 30, a display 32, a sensing device 34, and a communications interface 36. General communication between the components in the computing device 10 is provided via the bus 26.

The processor 18 executes software instructions, or computer programs, stored in the memory 20. As used herein, the term processor is not limited to just those integrated circuits referred to in the art as a processor, but broadly refers to a computer, a microcontroller, a microcomputer, a programmable logic controller, an application specific integrated circuit, and any other programmable circuit capable of executing at least a portion of the functions and/or methods described herein. The above examples are not intended to limit in any way the definition and/or meaning of the term "processor."

The memory 20 may be any non-transitory computer-readable recording medium. Non-transitory computer-readable recording media may be any tangible computer-based device implemented in any method or technology for short-term and long-term storage of information or data. Moreover, the non-transitory computer-readable recording media may be implemented using any appropriate combination of alterable, volatile or non-volatile memory or non-alterable, or fixed, memory. The alterable memory, whether volatile or non-volatile, can be implemented using any one or more of static or dynamic RAM (Random Access Memory), a floppy disc and disc drive, a writeable or re-writeable optical disc and disc drive, a hard drive, flash memory or the like. Similarly, the non-alterable or fixed memory can be implemented using any one or more of ROM (Read-Only Memory), PROM (Programmable Read-Only Memory), EPROM (Erasable Programmable Read-Only Memory), EEPROM (Electrically Erasable Programmable Read-Only Memory), and disc drive or the like. Furthermore, the non-transitory computer-readable recording media may be implemented as smart cards, SIMS, any type of physical and/or virtual storage, or any other digital source such as a network or the Internet from which computer programs, applications or executable instructions can be read.

The memory 20 may be used to store any type of data 38, for example, data records of users. Each data record is typically for a respective user. The data record for each user may include data such as, but not limited to, the user's name, passphrases, passphrase identifiers, biometric modality data, biometric templates, features matrices, embeddings, and personal data. Passphrase identifiers may also be referred to as utterance identifiers. A biometric template can be any type of mathematical representation of biometric modality data and can be associated with a class of data. For example, a template can be any mathematical function of one or more embeddings. Biometric modality data is the data of a biometric modality of a person. For the methods and systems described herein, the biometric modality is voice.

Voice biometric data may be captured by the computing device 10 by recording a user speaking a passphrase. Captured voice biometric data may be temporarily or permanently stored in the computing device 10 or in any device capable of communicating with the computing device 10 via the network 16. Voice biometric data is captured as audio data. Audio signals are audio data. As used herein, capture means to record temporarily or permanently, any data including, for example, biometric modality data of a person.

The term "personal data" as used herein includes any demographic information regarding a user as well as contact information pertinent to the user. Such demographic information includes, but is not limited to, a user's name, age, date of birth, street address, email address, citizenship, marital status, and contact information. Contact information can include devices and methods for contacting the user.

Additionally, the memory 20 can be used to store any type of software 40. As used herein, the term "software" is intended to encompass an executable computer program that exists permanently or temporarily on any non-transitory computer-readable recordable medium that causes the computing device 10 to perform at least a portion of the functions, methods, and/or algorithms described herein. Application programs are software and include, but are not limited to, operating systems, Internet browser applications, authentication applications, feature extraction computer programs, machine learning algorithms (MLA), machine learning models, and any other software and/or any type of instructions associated with algorithms, processes, or operations for controlling the general functions and operations of the computing device 10. The software may also include computer programs that implement buffers and use RAM to store temporary data.

Authentication applications enable the computing device 10 to conduct user verification and identification (1:C) transactions with any type of authentication data, where "C" is a number of candidates. Feature extraction computer programs process audio signals to generate a representative feature vector that contains information about the signal. Machine learning models have parameters which are modified during training to optimize functionality of the models trained using a machine learning algorithm (MLA). MLAs include at least classifiers and regressors. Example classifiers are Time Delay Neural Networks and Residual Networks.

The process of verifying the identity of a user is known as a verification transaction. Typically, during a verification transaction based on voice biometric data a verification template is generated from a spoken passphrase captured during the transaction. The verification template is compared against a corresponding recorded enrolment template of the user and a score is calculated for the comparison. The recorded enrolment template is created during enrolment of the user in an authentication system. If the calculated score is at least equal to a threshold score, the identity of the user is verified as true. Alternatively, the captured voice biometric data may be compared against the corresponding record voice biometric data to verify the identity of the user.

The user interface 30 and the display 32 allow interaction between a user and the computing device 10. The display 32 may include a visual display or monitor that displays information. For example, the display 32 may be a Liquid Crystal Display (LCD), an active matrix display, plasma display, or cathode ray tube (CRT). The user interface 30 may include a keypad, a keyboard, a mouse, an illuminator, a signal emitter, a microphone, and/or speakers.

Moreover, the user interface 30 and the display 32 may be integrated into a touch screen display. Accordingly, the display may also be used to show a graphical user interface, which can display various data and provide "forms" that include fields that allow for the entry of information by the user. Touching the screen at locations corresponding to the display of a graphical user interface allows the person to interact with the computing device 10 to enter data, change settings, control functions, etc. Consequently, when the touch screen is touched, the user interface 30 communicates this change to the processor 18, and settings can be changed or user entered information can be captured and stored in the memory 20. The display 32 may function as an illumination source to apply illumination to an object while image data for the object is captured.

The sensing device 34 may include Radio Frequency Identification (RFID) components or systems for receiving information from other devices in the system 100 and for transmitting information to other devices in the system 100. The sensing device 34 may alternatively, or additionally, include components with Bluetooth, Near Field Communication (NFC), infrared, or other similar capabilities. Communications between the computing device 10 of the user, the server 12, and the computer 14 may occur via NFC, RFID, Bluetooth or the like only so a network connection from the computing device 10 is unnecessary.

The communications interface 36 may include various network cards, and circuitry implemented in software and/or hardware to enable wired and/or wireless communications with other computing devices 10 (not shown), the server 12, and the computer 14 via the network 16. Communications include, for example, conducting cellular telephone calls and accessing the Internet over the network 16. By way of example, the communications interface 36 may be a digital subscriber line (DSL) card or modem, an integrated services digital network (ISDN) card, a cable modem, or a telephone modem to provide a data communication connection to a corresponding type of telephone line. As another example, the communications interface 36 may be a local area network (LAN) card (e.g., for Ethernet™ or an Asynchronous Transfer Model (ATM) network) to provide a data communication connection to a compatible LAN. As yet another example, the communications interface 36 may be a wire or a cable connecting the computing device 10 with a LAN, or with accessories such as, but not limited to, other computing devices. Further, the communications interface 36 may include peripheral interface devices, such as a Universal Serial Bus (USB) interface, a PCMCIA (Personal Computer Memory Card International Association) interface, and the like.

The communications interface 36 also allows the exchange of information across the network 16. The exchange of information may involve the transmission of radio frequency (RF) signals through an antenna (not shown). Moreover, the exchange of information may be between the computing device 10, the server 12, the computer 14, other computing devices (not shown), and other computer systems (not shown) capable of communicating over the network 16.

Examples of other computer systems (not shown) include computer systems of service providers such as, but not limited to, financial institutions, medical facilities, national security agencies, merchants, and authenticators. The computing devices (not shown) may be associated with any user or with any type of entity including, but not limited to, commercial and non-commercial entities.

The server 12 and the computer 14 may include the same or similar components as described herein with regard to the computing device 10. The server 12 and computer 14 need not include all the same components described herein with regard to the computing device 10. For example, the server 12 and the computer 14 may not include the gyroscope 22 and/or accelerometer 24.

Figure 3:
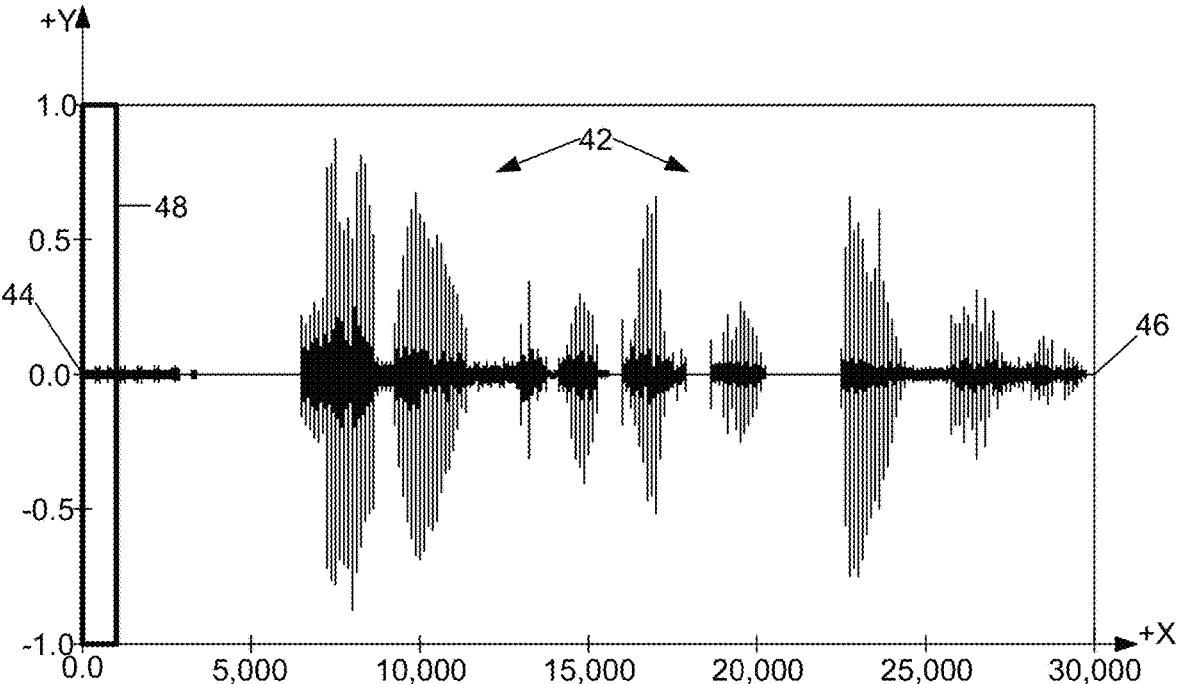
FIG. 3 is a diagram illustrating an example audio signal including a temporal window.

FIG. 3 is a diagram illustrating an example audio signal 42 captured by the computing device 10 while a user spoke a passphrase. The audio signal 42 may be captured by the computing device 10 while it is operated by the user or another person. The audio signal 42 may be captured as a continuous analog signal and converted into an audio signal by sampling at any frequency within the range of 8 kHz and 96 kHz. The audio signal 42 may be provided in Pulse Code Modulation (PCM) in 8, 16, or 24 bits or in compressed format, for example, in flac, mp3, a-law, mu-law and amr, and may be filtered using a pre-emphasis filter that amplifies the high-frequency content of the data. The audio signal 42 is audio data that includes voice biometric data of the user and information about a passphrase spoken by the user.

The audio signal 42 is plotted on a Cartesian coordinate system having X and Y-axes. The X-axis represents the number of discrete elements included in the captured audio signal 42 in which each discrete element is captured at a rate, in seconds, equal to the inverse of a sampling frequency. The Y-axis represents the normalized values of the discrete elements of the signal 42. Alternatively, the Y-axis may represent the actual values of the discrete elements in the signal 42. The audio signal 42 extends from the origin 44 to a terminus 46 and has a duration of about three (3) seconds. The duration of the audio signal 42 depends on the length of the spoken passphrase which may also vary.

A temporal window 48 is located in an initial position flush with the origin 44 and has a duration of twenty-five (25) milliseconds. Alternatively, the temporal window 48 may be any duration that facilitates creating matrices from which embeddings can be extracted and used to generate accurate and trustworthy authentication results as described herein. The window 48 is translated in the positive direction along the X-axis over the duration of the signal 42 in ten (10) millisecond increments. Consequently, the temporal window 48 occupies many different positions over the signal 42. The 10-millisecond increment is the frame rate which may be any value that facilitates calculating signal features as described herein.

The window 48 can be implemented as a mathematical function that multiples the audio signal 42 by a window function. That is, a window function that is zero-valued outside of a chosen temporal interval and symmetric around the middle of the interval. The non-zero temporal interval of the window function is translated by the frame rate over the duration of the audio signal 42. The window function can be a Hamming window function. However, any window function may alternatively be used that facilitates calculating signal features as described herein.

In each different position, the window 48 includes a different portion of the signal 42, which portion is processed, for example, by a feature extraction computer program to calculate signal features including, but not limited to, mel-sprectrum Fourier coefficients. Alternatively, any other type of coefficients representative of the audio signal be used.

The feature extraction computer program uses a Fast Fourier Transform to calculate the coefficients. For each different window position, eighty (80) melspectrum Fourier coefficients are calculated. Alternatively, any number of coefficients may be calculated that facilitates creating a matrix from which embeddings may be extracted.

The calculated melspectrum Fourier coefficients constitute the dimensions of a single acoustic vector at a position of the window over the signal 42. The audio signal 42 is three seconds in duration, so the window 48 occupies three hundred (300) different positions. As a result, three hundred (300) acoustic vectors are created. The number of created acoustic vectors depends on the duration of the audio signal 42. Thus, for any captured audio signal 42, the number of created acoustic vectors may be more or less than three hundred (300). An m×n matrix may be created from the acoustic vectors, where "m" indicates the number of acoustic vectors and "n" indicates the dimension of each acoustic vector. For the example audio signal 42, the m×n matrix includes an acoustic vector for each window position, yielding a matrix having dimensions of m=300 and n=80. Additionally, the matrices may alternatively be the raw audio signal with or without any previous modifications.

Generally, a passphrase spoken by a user can be referred to as an utterance. A passphrase is typically a phrase. Example passphrases include but are not limited to, "My voice is my password, verify me" and "I have several busy children, verify me." Alternatively, a passphrase may be a single letter or number, a group of letters or numbers, any combination of letters and numbers, or one or more sentences. Any passphrase may be spoken to generate the audio signal 42.

A passphrase identifier, for example, a number may be assigned to each passphrase. For example, the number one (1) may be assigned to the passphrase "My voice is my password, verify me", while the number two (2) may be assigned to the passphrase "I have several busy children, verify me". Alternatively, the password identifier may be any combination of alphanumeric characters or only letters. Meta data associated with the audio signal 42 includes, but is not limited to, the identity of the user who spoke the passphrase to generate the signal 42 and a passphrase identifier for the spoken passphrase.

Many different audio signals representing different spoken passphrases may be created by a same or different person. Each user identity and corresponding passphrase identifier constitutes a different class of data which may be denoted as, for example, (user identity, passphrase identifier). For example, Joe Smith and the passphrase identifier for the passphrase "My voice is my password, verify me" may constitute one class of data, while the passphrase identifier for the passphrase "I have several busy kids, verify me" spoken by Joe Smith may constitute a different class of data. These classes of data may be denoted (Joe Smith, 1) and (Joe Smith, 2), respectively. Additionally, Joe Smith and the passphrase identifier for the passphrase "I'm going skiing, verify me" may constitute a different class of data, while the passphrase identifier for the passphrase "My voice is my password, verify me" spoken by Alvina McDermott may constitute yet another different class of data. These classes of data may be denoted as (Joe Smith, 3) and (Alvina McDermott, 1), respectively, where the number three (3) is the passphrase identifier for the passphrase "I'm going skiing, verify me".

Audio signals generated by speaking a passphrase are assigned to the corresponding class of data. For example, the audio signal generated by Alvina McDermott speaking the passphrase "My voice is my password, verify me" is assigned to the class (Alvina McDermott, 1).

Although the class of data is described herein as including the user identity and a passphrase identifier, it is contemplated by the present disclosure that the class of data may alternatively include any set of items of data that may be used to train a machine learning model capable of verifying whether or not two audio signals belong to the same class of data. The set may include any combination of items of data, for example, a pair of items of data. The items of data include, but are not limited to, user identity, passphrase identifiers, passphrases, and biometric modality data. As a result of determining two audio signals belong to the same class, the trained machine learning model enables simultaneously successfully verifying the identity of a user based on voice biometric data and verifying that the user spoke a correct passphrase.

The total number of users and associated spoken passphrases may be designated as "$C_{inv}$", and each user may have a set of spoken passphrases designated as $utt_s^{p,k}$, where "s" is the index for the user identity, "p" is the index for the spoken passphrase's identifier, and "k" is the index for the number of occurrences of the same passphrase. Thus, for example, a spoken passphrase designated as $utt_s^{p,3}$ indicates that the spoken passphrase is the third occurrence of the passphrase corresponding to the password identifier "p" for user identity "s".

Each m×n matrix may be designated "x." A subscript including the indexes "s" and "p" may be used to designate the class of the audio data while a superscript including the index "k" may be used to designate the index of the occurrence. Thus, for example, the notations $x_{s_1,p_1}^{1}$ and $x_{s_1,p_1}^{2}$ represent matrices associated with the first and second occurrences, respectively, of user $s_1$ speaking the passphrase corresponding to passphrase identifier $p_1$. As a result, the matrices $x_{s_1,p_1}^{1}$ and $x_{s_1,p_1}^{2}$ are assigned to the same class of audio data. As another example, the notations $x_{s_2,p_1}^{1}$ and $x_{s_2,p_2}^{1}$ represent matrices associated with a first occurrence of user $s_2$ speaking the passphrase corresponding to passphrase identifier $p_1$ and a first occurrence of user $s_2$ speaking the passphrase corresponding to passphrase identifier $p_2$, respectively. Thus, the class of the matrix $x_{s_2,p_1}^{1}$ is different than the class of the matrix $x_{s_2,p_2}^{1}$. As a result, the matrices $x_{s_2,p_1}^{1}$ and $x_{s_2,p_2}^{1}$ are assigned to different classes of audio data. It is contemplated by the present disclosure that different notations and/or designations may be used to indicate whether or not matrices belong to the same or different class.

The audio signal 42 includes voice biometric data of a user and information about a passphrase spoken by the user. Audio signals generated by different people speaking the same or different passphrase include different voice biometric data and information regarding the spoken passphrase and belong to different classes. As a result, audio signals generated by different people speaking the same or different passphrase are different. Because the audio signals contain biometric data about a user and information about a spoken passphrase, matrices created from such signals are a function of voice biometric data and information about a spoken passphrase.

A machine learning model for conducting authentication transactions may be trained using a machine learning algorithm (MLA). Such machine learning models include, but are not limited to, text independent automatic speaker verification (TI-ASV) models and automatic speech recognition (ASR) models. Known methods of processing spoken passphrases and validating the passphrases include processing the spoken passphrases by a TI-ASV model to validate the user's identity, and processing the same spoken passphrase by an ASR model to validate the passphrase. Training to generate the TI-ASV and ASR models occurs separately.

MLAs typically require the definition of an objective function when being used to train a machine learning model for performing a desired function. The objective function is referred to herein as a "loss function." Loss functions define an objective against which the performance of the machine learning model is measured during training. Parameters learned by the machine learning model during training are determined by minimizing the loss function. Most common losses are known as categorical losses, for example, the cross-entropy loss.

During training of a TI-ASV model, the class of data of each audio signal is the identity of the person who spoke the passphrase to generate the signal. A class of data including user identities is input into the MLA. Using the loss function, the MLA calculates a loss associated with the user identities and the loss is used to modify parameters of the TI-ASV model being trained. Parameters include, but are not limited to, weight and bias. After modifying the parameters, the user identities are again input into the MLA which again calculates a unique loss associated with the user identities which is used to again modify the model's parameters. This process is repeated until a minimum loss is calculated which indicates that the TI-ASV model has been adequately trained to be operable to conduct authentication transactions based on user identities.

During training of an ASR model, a database of audio signals each having annotations is input into the MLA. Example annotations include, but are not limited to, words with associated time stamps. Using a MLA to train an ASR model requires processing large amounts of audio signal data with annotations, which is time consuming and expensive. Using the loss function, the MLA calculates a loss associated with the audio signals and the loss is used to modify parameters of the ASR model being trained. Parameters include, but are not limited to, weight and bias. After modifying the parameters, the audio signals are again input into the MLA which again calculates a unique loss associated with the spoken phrases. The unique loss is used to again modify the parameters. This process is repeated until a minimum loss is calculated which indicates that the ASR model has been adequately trained to be used during authentication transactions for validating that a secret passphrase has correctly been uttered by a user.

ASR models are language dependent so a different ASR model is required for each language used by an authentication system. As a result, several ASR models may need to be trained for a system which conducts authentication transactions for different languages. Training a plurality of ASR models is time consuming, inefficient and expensive.

Moreover, during verification transactions captured audio signals need to be separately processed by both the TI-ASV and ASR models which increases the time and costs of generating accurate and trustworthy authentication transaction results and thus enhances user inconvenience. Additionally, ASR models are language dependent and so a different ASR model is required for each language used by an authentication system To address these problems a machine learning model may be trained using a training dataset of audio signals. Each of the audio signals includes voice biometric data of a user and information for a passphrase spoken by the user, and belongs to a same or different data class. Each data class, or class of data, includes a user identity and a passphrase identifier. A feature matrix can be created for each audio signal. The matrices are input into a machine learning model being trained using a machine learning algorithm (MLA). The model can calculate one or more embeddings for each matrix. Embeddings are known to be a fixed-dimensional representation of variable-length audio signals. When the machine learning model is defined as a deep neural network (DNN) model, embeddings are usually generated from one of the hidden layers of the DNN. Audio signals that belong to the same class of data are typically close to each other in the embedding space.

The MLA may use the embeddings to create, or calculate, a loss and the created loss may be used by the MLA to update parameters of the machine learning model being trained. Example parameters include, but are not limited to, weight and bias. In response to determining criteria defining the end of training have been satisfied, the trained machine learning model is deemed operable to enable simultaneously successfully verifying the identity of the user based on voice biometric data and verifying the correct passphrase was spoken during an authentication transaction.

Embeddings are a mathematical representation of a matrix so may be expressed as $f(x)$. More specifically, the embeddings computed from the feature matrix $x_{s_1,p_1}{}^1$ may be expressed, for example, as $f(x_{s_1,p_1}{}^1)$. Because matrices are a function of the voice biometric data of a user and information regarding a spoken passphrase, content extracted from the matrices, for example, embeddings are also a function of the voice biometric data of a user and information regarding the spoken passphrase. The matrices and embeddings extracted therefrom may be stored in the computing device 10.

It is contemplated by the present disclosure that a machine learning model for conducting authentication transactions may be trained using a MLA and audio signals from classes of data defined by the user identity and the spoken passphrase identifier. The number of classes of data corresponds to the number of user identities multiplied by the number of passphrase identifiers. It is potentially infinite and a categorial loss such as cross entropy may not be efficient to train the machine learning model. Thus, the loss during training should be calculated using metric losses such as, but not limited to, a triplet loss, a prototypical loss, and a contrastive loss.

Triplet loss is a loss function for MLAs where a baseline input is compared to a positive input and a negative input. A positive input is from the same class as the baseline input and the negative input is from a different class than the baseline input. The triplet loss facilitates updating parameters of the machine learning model being trained in order to minimize the distance from the baseline input to the positive input, and to maximize the distance from the baseline input to the negative input.

For each iteration of the training process, triplet losses can be calculated during training using the following equations:

$$L_s = \frac{1}{n_s(n_s-1)} \sum_{i \in N_s} \sum_{j \in N_s \setminus i} \max\left( \left\| f(x_s^i) - f(x_s^j) \right\|_2^2 - \left\| f(x_s^i) - f(x_r^k) \right\|_2^2 + \alpha_{trp}, 0 \right)$$

and $$L_{trp} = \frac{1}{n} \sum_s L_s$$

Where:

$L_{trp}$ is the triplet loss;

$L_s$ is the loss calculated separately for each class s;

Matrices $x_s^i$ and $x_s^j$ belong to the same class, class s, which means the user and the spoken passphrase are the same. Additionally, matrices $x_s^i$ and $x_s^j$ are different occurrences of the same class of audio signals, being occurrence i and j, respectively, of the audio data class s.

Matrix $s_r^k$ belongs to a different class, class r, at an occurrence k. "r" is considered a negative input class because it is different than "s". The negative input class and occurrences, r and k, respectively, may be randomly selected. Alternatively, any other method may be used, for example, a method for selecting a negative input class r may include selecting the class with the highest authentication score against class s and using current parameters of the machine learning model during training.

Functions $f(x_s^i)$, $f(x_s^j)$, $f(s_r^k)$ are the embeddings created from the matrices $x_s^i$, $x_s^j$ and $x_r^k$, respectively, while passing the window 48 over the signal 42 for respective users and passphrases.

N is an ensemble of different classes of data in the training database;

n is the number of elements in ensemble N;

$N_s$ is the number of occurrences of an audio signal for class s;

$n_s$ is the number of elements in ensemble s;

$N_s \setminus i$ is the ensemble of occurrences of audio signals for class s except for occurrence i; and $\alpha_{trp}$ is a margin of error.

Known systems do not use a pair of items of data including, for example, a user identity and a passphrase identifier. Rather, known systems use classes of data that each include a single item of training data, for example, user identity only.

Training a machine learning model using the above equations for calculating triplet losses $L_{trp}$ facilitates creating a model operable for simultaneously successfully verifying the identity of a user based on voice biometric data and verifying the user spoke the correct passphrase during an authentication transaction. The machine learning model enables a user to directly choose his or her own personal passphrase which is unique and known by the user only. That is, all users are not required to speak the same passphrase. Moreover, the machine learning model is operable to process spoken passphrases in any language, so language dependent ASR models need not be trained and deployed. As a result, the machine learning model facilitates quickly generating accurate and trustworthy authentication transaction results and facilitates reducing costs for generating such results.

Figure 4:
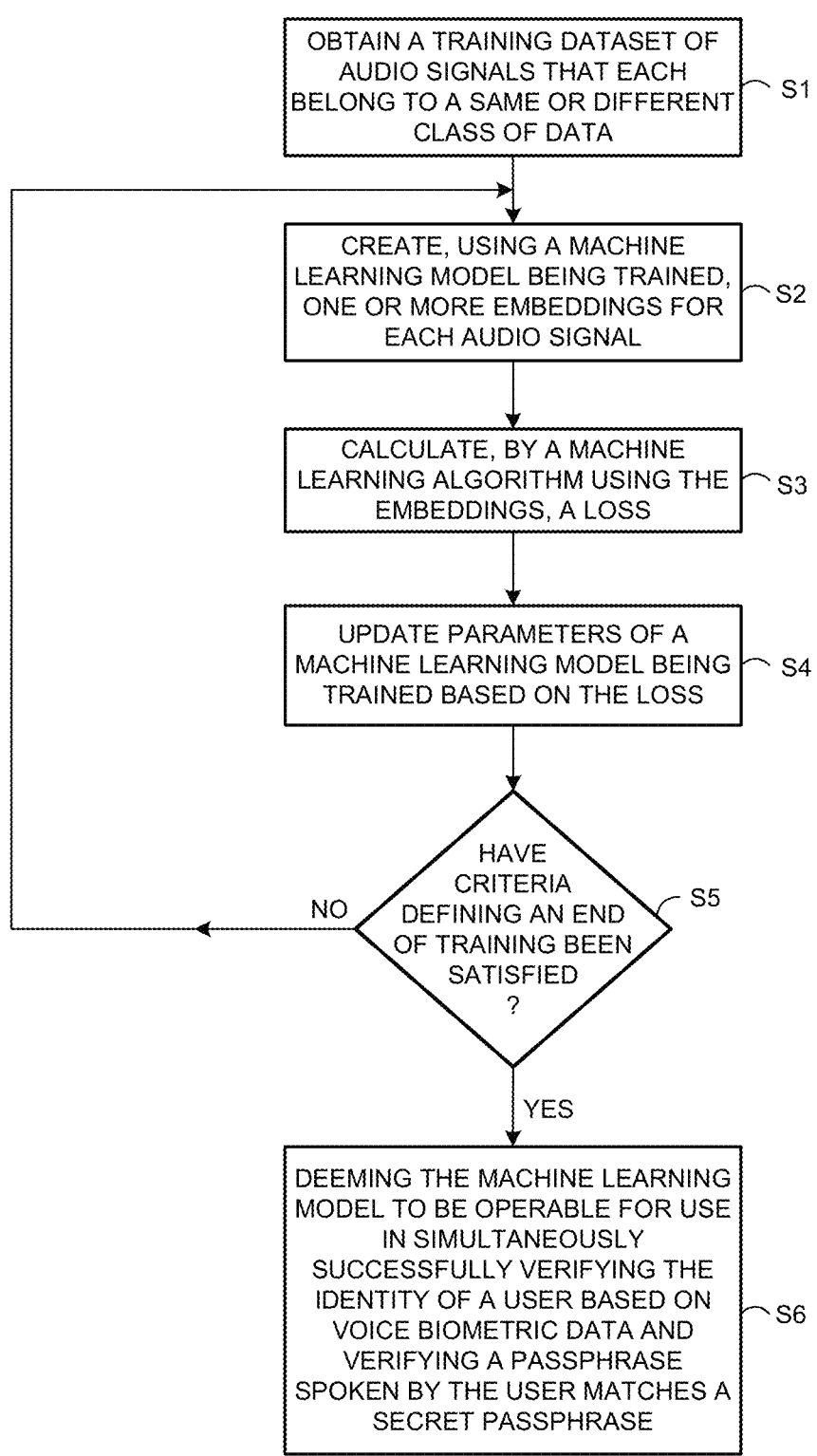
FIG. 4 is a flowchart illustrating an example method and algorithm for training a machine learning model for use in conducting authentication transactions according to an embodiment of the present disclosure.

FIG. 4 is a flowchart illustrating an example method and algorithm for training a machine learning model for use in conducting authentication transactions based on voice biometric data. FIG. 4 illustrates example operations performed when the computing device 10 runs software 40 stored in the memory 20 to train machine learning model for use in conducting authentication transactions. A user may cause the computing device 10 to run the software 40 or the computing device 10 may automatically run the software 40.

In step S1, the software 40 executed by the processor 18 causes the computing device 10 to obtain a training dataset of audio signals that each belong to a same or different class of data. Each audio signal includes voice biometric data of a user and information for a passphrase spoken by the respective user. Each class of data includes the identity of a user and a passphrase identifier corresponding to a spoken passphrase. For example, Joe Smith and the passphrase identifier for the passphrase "My voice is my password, verify me" may constitute one class of data, while the passphrase identifier for the passphrase "I have several busy kids, verify me" spoken by Joe Smith may constitute a different class of data. These classes of data may be denoted (Joe Smith, 1) and (Joe Smith, 2), respectively. Additionally, Joe Smith and the passphrase identifier for the passphrase "I'm going skiing, verify me" may constitute a different class of data, while the passphrase identifier for the passphrase "My voice is my password, verify me" spoken by Alvina McDermott may constitute yet another different class of data. These classes of data may be denoted as (Joe Smith, 3) and (Alvina McDermott, 1), respectively, where the number three (3) is the passphrase identifier for the passphrase "I'm going skiing, verify me".

The machine learning model being trained is software that includes parameters such as, but not limited to, weight and bias. It is contemplated by the present disclosure that the parameters may be changed based on a calculated loss to enable enhancing functionality of the model. As discussed herein, the machine learning model is trained using a machine learning algorithm (MLA) executed by the processor 18.

Next, in step S2, the machine learning model being trained is executed by the processor 18 to cause the computing device 10 to create one or more embeddings for each audio signal in each class of data. More specifically, the computing device 10 can create a feature matrix $x_s^i$, $x_s^j$ or $x_r^k$ for each audio signal in each class of data and input the matrices $x_s^i$, $x_s^j$ and $x_r^k$ into the machine learning model being trained using the MLA. The feature matrices $x_s^i$, $x_s^j$ or $x_r^k$ may be created, for example, by translating a window implemented as a mathematical function over each audio signal. During translation, the window may occupy many different positions on the respective signal. Fourier coefficients may be calculated in each position and these coefficients may be used to create a matrix $x_s^i$, $x_s^j$ or $x_r^k$ for the respective signal. Alternatively, any other type of coefficients representative of the audio signal be used. Additionally, the matrices may alternatively be the raw audio signal with or without any previous modifications. Thus, it should be understood that the machine learning model being trained is executed by the processor 18 to cause the computing device 10 to create the embeddings by calculating one or more embeddings for each of the matrices $x_s^i$, $x_s^j$ or $x_r^k$. An embedding is a mathematical representation of a matrix which may be expressed as $f(x)$. The embeddings of the matrices $x_s^i$, $x_s^j$ and $x_r^k$ may be expressed as $f(x_s^i)$, $f(x_s^j)$ and $f(x_r^k)$, respectively.

In step S3, the MLA software executed by the processor 18 causes the computing device 10 to calculate, using the created embeddings, a loss, $L_s$, for each class of data and a triplet loss, $L_{trp}$, according to the following equations:

$$L_s = \frac{1}{n_s(n_s-1)} \sum_{i \in N_s} \sum_{j \in N_s \backslash i} \max(\|f(x_s^i) - f(x_s^j)\|_2^2 - \|f(x_s^i) - f(x_r^k)\|_2^2 + \alpha_{trp}, 0)$$

and $$L_{trp} = \frac{1}{n} \sum_s L_s$$

Where:

$L_{trp}$ is the triplet loss;

$L_s$ is the loss calculated separately for each class s;

Matrices $x_s^i$ and $x_s^j$ belong to the same class, class s, which means the user and the spoken passphrase for the matrices are the same. Additionally, matrices $x_s^i$ and $x_s^j$ are different occurrences of the same class of audio signals, being occurrence i and j, respectively, of the audio data class s.

Matrix $x_r^k$ belongs to a different class, class r, at an occurrence k. "r" is considered a negative input class because it is different than "s".

Functions $f(x_s^i)$, $f(x_s^j)$, $f(x_r^k)$ are the embeddings created from the matrices $x_s^i$, $x_s^j$ and $x_r^k$, respectively, while passing the window 48 over the signal 42 for respective users and passphrases.

N is an ensemble of different classes of data in the training database;

n is the number of elements in ensemble N;

$N_s$ is the number of occurrences of an audio signal for class s;

$n_s$ is the number of elements in ensemble s;

$N_s \backslash i$ is the ensemble of occurrences of audio signals for class s except for occurrence i; and $\alpha_{trp}$ is a margin of error.

In step S4, the MLA software 40 executed by the processor 18 causes the computing device 10 to update parameters of the machine learning model being trained based on the calculated loss $L_{trp}$. Next in step 55, the software 40 executed by the processor 18 causes the computing device 10 to determine whether or not criteria defining an end of training have been satisfied. Such criteria include, but are not limited to, convergence of calculated losses and a number of times the matrices have been input into the machine learning model being trained. The loss may be considered to converge when a number of consecutive calculated losses does not decrease, for example, two consecutive losses, or the decrease is less than a threshold. Alternatively, any number of consecutive losses may be used. The matrices may be entered into the machine learning model being trained any number of times, for example, 100 times that facilitates training a machine learning model capable of simultaneously successfully verifying the identity of a user based on voice biometric data and verifying the user spoke a correct passphrase.

When the criteria defining the end of training have been satisfied, in step S6, training is complete and the machine learning model can be deemed operable to enable simultaneously successfully verifying the identity of a user based on voice biometric data and verifying the user spoke a correct passphrase. Otherwise, in step S2, the software 40 executed by the processor 18 causes the computing device 10 to create an embedding for each audio signal. It is contemplated by the present disclosure that steps S2, S3, S4, and S5 may be repeatedly conducted until the criteria defining the end of training are satisfied in step S5.

Using the method and algorithm for training a machine learning model facilitates creating a machine learning model that enables simultaneously successfully verifying the identity of a user based on voice biometric data and verifying the user spoke the correct passphrase. Moreover, the machine learning model enables a user to directly choose his or her own personal passphrase which is unique and known by the user only. That is, all users are not required to speak the same passphrase. Additionally, the machine learning model is operable to process spoken passphrases in any language, so language dependent ASR models need not be trained and deployed. As a result, the machine learning model facilitates quickly generating accurate and trustworthy authentication transaction results from captured voice biometric data and facilitates reducing costs for generating such results.

FIG. 5 is a flowchart illustrating an example method and algorithm for enrolling a user in an authentication system implemented by the computing device 10. FIG. 5 illustrates example operations performed when the computing device 10 runs software 40 stored in the memory 20 to enroll a user. A user may cause the computing device 10 to run the software 40 or the computing device 10 may automatically run the software 40.

In step S7, the software 40 executed by the processor 18 causes the computing device 10 to prompt a user to speak a secret passphrase. For example, the computing device 10 may ask the user to choose a secret passphrase or display a secret passphrase and a message to speak the passphrase a number of times. The message may be any type of instruction that prompts the user to speak a passphrase any number of times, for example, three. An example secret passphrase may be "I'm going skiing, verify me" and an example message may instruct the user to speak the passphrase three times.

In step S8, the software 40 executed by the processor 18 causes the computing device 10 to capture voice biometric data of the user speaking the secret passphrase. The voice biometric data is captured as audio data in the form of an audio signal, for example, audio signal 42. Thus, when the secret passphrase is to be captured three times, three different audio signals are captured.

In step S9, the software 40 executed by the processor 18 causes the computing device 10 to create a feature matrix for each captured audio signal and, in step S10, to input the matrices into a machine learning model trained to conduct authentication transactions, for example, as described herein with regard to the flowchart illustrated in FIG. 4. The trained machine learning model software is executed by the processor 18 to cause the computing device 10 to calculate one or more embeddings for each matrix. Next, in step S11, the software 40 executed by the processor 18 causes the computing device 10 to create an enrolment template from the embeddings and store the template in the memory 20. The enrolment template can be any set of the embeddings or any function of the set of embeddings such as, but not limited to, the mean embedding vector or the reduced embedding vector. Thus, for example, when the secret passphrase is spoken three times, three matrices are created, embeddings are calculated for the matrices, and an enrollment template is created from the embeddings.

Figure 6:
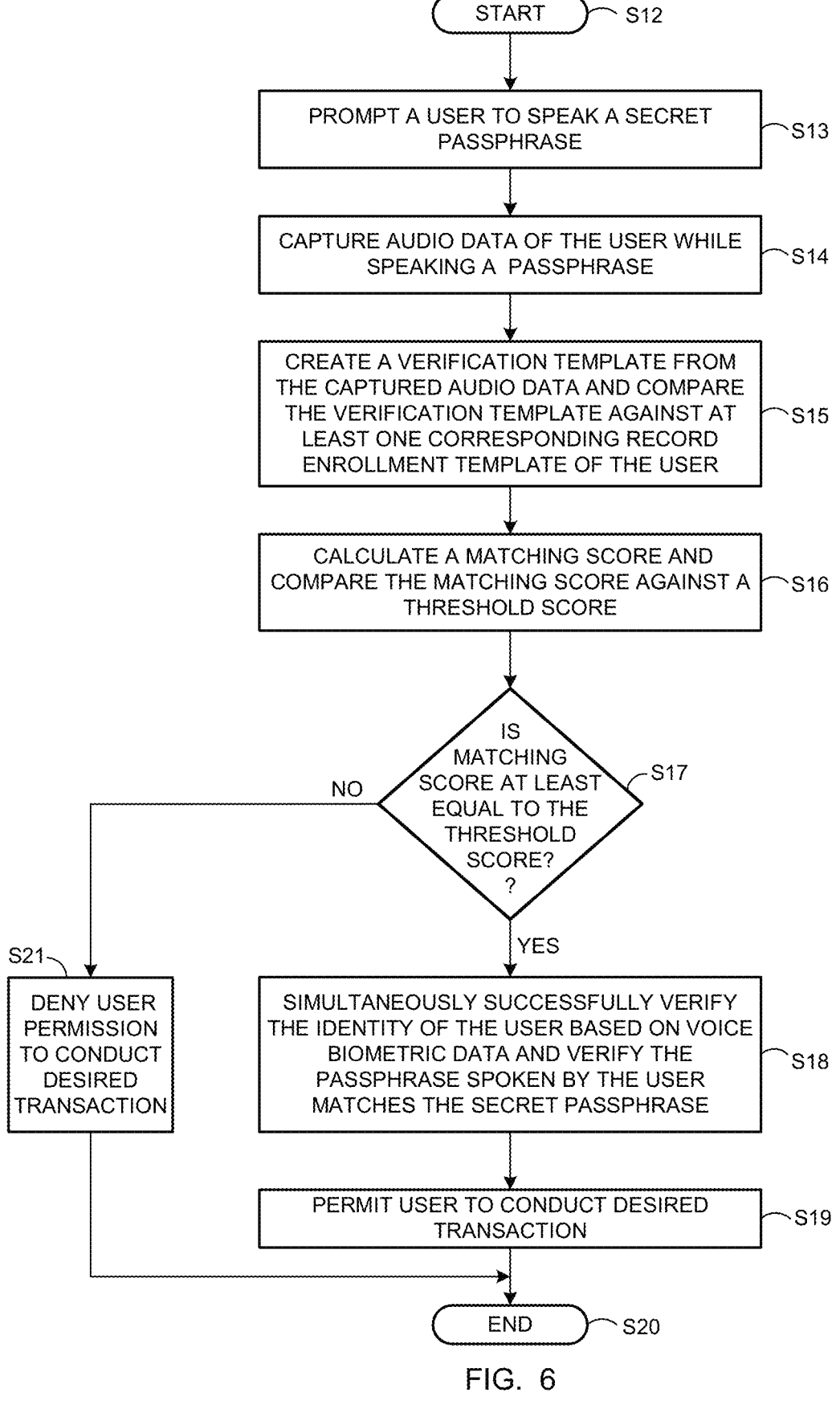
FIG. 6 is a flowchart illustrating an example method and algorithm for authenticating a user according to an embodiment of the present disclosure.

FIG. 6 is a flowchart illustrating an example method and algorithm for authenticating a user that may be implemented by a machine learning model trained to conduct authentication transactions, for example, as described herein with regard to the flowchart illustrated in FIG. 4. When a user desires to conduct an activity, the user may be required to prove his or her identity before being permitted to conduct the activity. Examples of activities include, but are not limited to, accessing an area within a commercial, residential or governmental building, or conducting a network-based transaction. Example network-based transactions include, but are not limited to, buying merchandise from a merchant service provider website and accessing top secret information from a computer system. FIG. 6 illustrates example operations performed by the computing device 10 during authentication transactions.

The method and algorithm start in step S12, then in step S13 the software 40 executed by the processor 18 causes the computing device 10 to prompt a user to speak a secret passphrase by displaying a message instructing the user to speak his or her secret passphrase. Alternatively, the secret passphrase and the message may both be displayed. In step S14, the computing device 10 captures audio data of the user while speaking a passphrase. The audio data is captured in the form of an audio signal, for example, audio signal 42.

In step S15, the software 40 executed by the processor 18 causes the computing device 10 to create a verification template from the captured audio data. More specifically, the computing device 10 creates a matrix from the captured audio data, extracts content from the matrix to create one or more embeddings, and creates a verification template from the embeddings. The verification template is compared against the corresponding enrolment template of the user and a matching score is calculated for the comparison. However, it should be understood that if both the verification and enrolment templates include several embeddings, each enrolment and verification embeddings combination is used to generate a matching score. A final matching score can be calculated as the average over all these scores or can be calculated using any other mathematical function allowing to combine them.

Next, in step S16, the software 40 executed by the processor 18 causes the computing device 10 to calculate a matching score and to compare the matching score against a threshold score. In step S17, the software 40 executed by the processor 18 causes the computing device 10 to determine whether or not the matching score is at least equal to the threshold score. In response to determining the matching score is at least equal to the threshold score, in step S18, the software 40 executed by the processor 18 causes the computing device 10 to simultaneously successfully verify the identity of the user based on voice biometric data and verify the passphrase spoken by the user matches the secret passphrase.

It should be understood that when the matching score is at least equal to the threshold score the computing device 10 determines that the captured audio signal belongs to the same class of data as the audio signal or signals captured during enrollment. By virtue of determining the captured and enrollment audio signal belong to the same class, the computing device 10 simultaneously successfully verifies the identity of the user based on voice biometric data and verifies the passphrase spoken by the user matches the secret passphrase.

Next, in step S19, the user is permitted to conduct the desired transaction and in step S20, the method and algorithm end. However, when the matching score is less than the threshold score, in step S19, the user is denied permission to conduct the desired transaction. In step S20, the method and algorithm end.

Using the method and algorithm for conducting authentication transactions based on audio data enables simultaneously successfully verifying the identity of a user based on voice biometric data and verifying the user spoke the correct passphrase. Moreover, the method enables processing spoken passphrases in any language, so language dependent ASR models need not be trained and stored. As a result, the method and algorithm for conducting authentication transactions facilitates reducing the time and costs of generating accurate and trustworthy authentication transaction results based on voice biometric data.

The example methods and algorithms described herein may be conducted entirely by the computing device 10, partly by the computing device 10 and partly by the server 12 via the network 16, or partly by the computing device 10 and the computer 14 via the network 16. Additionally, the methods and algorithms described herein may be conducted partly by the computing device 10, partly by the server 12 and partly by the computer 14 via the network 16. For example, the computer 14 may use a MLA to train a machine learning model for use in conducting authentication transactions, while the server 12 may conduct authentication transactions using the trained model, or vice versa. Moreover, the example methods described herein may be conducted entirely on other computer systems (not shown) other computing devices 10 (not shown). Thus, it should be understood that it is contemplated by the present disclosure that the example methods and algorithms described herein may be conducted using any combination of computers, computer systems, and computing devices (not shown). Furthermore, data described herein as being stored in the computing device 10 may alternatively, or additionally, be stored in the server 12, the computer 14, or in any computer system (not shown) or computing device (not shown) operable to communicate with the computing device 10 over the network 16.

Additionally, the example methods and algorithms described herein may be implemented with any number and organization of computer program components. Thus, the methods and algorithms described herein are not limited to specific computer-executable instructions. Alternative example methods and algorithms may include different computer-executable instructions or components having more or less functionality than described herein.

The example methods and/or algorithms described above should not be considered to imply a fixed order for performing the method and/or algorithm steps. Rather, the method and/or algorithm steps may be performed in any order that is practicable, including simultaneous performance of at least some steps. Moreover, the method and/or algorithm steps may be performed in real time or in near real time. It should be understood that, for any method and/or algorithm described herein, there can be additional, fewer, or alternative steps performed in similar or alternative orders, or in parallel, within the scope of the various embodiments, unless otherwise stated. Furthermore, the invention is not limited to the embodiments of the methods and/or algorithms described above in detail.

What is claimed is:

1. A method of training a machine learning model to conduct authentication transactions comprising the steps of:
    obtaining, by an electronic device, a training dataset of audio signals, wherein each audio signal includes voice biometric data of a user and information for a secret passphrase spoken by the user and belongs to a same or different data class, each data class comprises a user identity and a passphrase identifier, and each secret passphrase is a unique passphrase chosen by a respective user and is known by the respective user only;
    creating a feature matrix for each audio signal in each data class;
    inputting the matrices into the machine learning model being trained, wherein the machine learning model being trained includes parameters;
    calculating at least one embedding for each of the matrices;
    calculating, by a machine learning algorithm using the embeddings, a loss for each data class and a second loss based on the losses for each data class;
    updating the parameters of the machine learning model being trained based on the second loss; and
    in response to determining criteria defining an end of training have been satisfied, deeming the machine learning model to be operable for use in simultaneously successfully verifying the identity of a user based on voice biometric data and verifying a passphrase spoken by the user matches the secret passphrase of the user during authentication transactions.

2. The method according to claim 1, further comprising, in response to determining criteria defining an end of training have not been satisfied, repeatedly conducting said creating, inputting, calculating at least one embedding, calculating a loss and a second loss, and updating steps until the criteria are satisfied.

3. The method according to claim 1, said calculating step comprising the step of calculating a metric loss, wherein the metric loss is a triplet loss, a prototypical loss, or a contrastive loss.

4. The method according to claim 1, said calculating step comprising calculating the loss according to the equations $$L_s = \frac{1}{n_s(n_s-1)} \sum_{i \in N_s} \sum_{j \in N_s \setminus i} \max(\|f(x_s^i) - f(x_s^j)\|_2^2 - \|f(x_s^i) - f(x_r^k)\|_2^2 + \alpha_{trp}, 0)$$

and $$L_{trp} = \frac{1}{n}\sum_s L_s$$

Where:
    $L_{trp}$ is the triplet loss;
    $L_s$ is the loss calculated separately for each class s;

Matrices $x_s^i$ and $x_s^j$ belong to the same class, class s, which means the user and the spoken passphrase for the matrices are the same;

Matrix $x_r^k$ belongs to a different class, class r, at an occurrence k;

Functions $f(x_s^i)$, $f(x_s^j)$, $f(_r^k)$ are embeddings extracted from the input matrices $x_s^i$, $x_s^j$ and $x_r^k$, respectively;

N is an ensemble of different classes of data in the training dataset;

n is the number of elements in ensemble N;

$N_s$ is the ensemble of occurrences of audio signals for class s;

$n_s$ is the number of elements in ensemble s;

$N_s\backslash i$ is the ensemble of occurrences of audio signals for class s except for occurrence i; and $\alpha_{trp}$ is a margin of error.

5. An electronic device for training a machine learning model to conduct authentication transactions comprising:

a processor; and a memory configured to store data, said electronic device being associated with a network and said memory being in communication with said processor and having instructions stored thereon which, when read and executed by said processor, cause said electronic device to:

obtain a training dataset of audio signals, wherein each audio signal includes voice biometric data of a user and information for a secret passphrase spoken by the user and belongs to a same or different data class, each data class comprises a user identity and a passphrase identifier;

create a feature matrix for each audio signal in each data class;

input the matrices into the machine learning model being trained, wherein the machine learning model being trained includes parameters;

calculate at least one embedding for each of the matrices;

calculate, by a machine learning algorithm using the embeddings, a loss for each data class and a second loss based on the losses for each data class;

update the parameters of the machine learning model being trained based on the second loss; and in response to determining criteria defining an end of training have been satisfied, deem the machine learning model to be operable for use in simultaneously successfully verifying the identity of a user based on voice biometric data and verifying a passphrase spoken by the user matches the secret passphrase of the user during authentication transactions.

6. The electronic device according to claim 5, wherein the instructions when read and executed by said processor, cause said electronic device to repeatedly:

create a feature matrix for each audio signal in each class of data;

input the matrices into the machine learning model being trained;

calculate at least one embedding for each of the matrices;

calculate the loss for each class of data and the second loss; and update the parameters of the machine learning model being trained based on the calculated losses until the criteria are satisfied.

7. The electronic device according to claim 5, wherein instructions when read and executed by said processor, cause said electronic device to calculate a metric loss, wherein the metric loss is a triplet loss, a prototypical loss, or a contrastive loss.

8. The electronic device according to claim 5, wherein the instructions when read and executed by said processor, cause said electronic device to calculate the loss according to the equations $$L_s = \frac{1}{n_s(n_s-1)} \sum_{i \in N_s} \sum_{j \in N_s \backslash i} \max\left( \left\| f(x_s^i) - f(x_s^j) \right\|_2^2 - \left\| f(x_s^i) - f(x_r^k) \right\|_2^2 + \alpha_{trp}, 0 \right)$$

and $$L_{trp} = \frac{1}{n} \sum_s L_s$$

Where:

$L_{trp}$ is the triplet loss;

$L_s$ is the loss calculated separately for each class s;

Matrices $x_s^i$ and $x_s^j$ belong to the same class, class s, which means the user and the spoken passphrase for the matrices are the same;

Matrix $x_r^k$ belongs to a different class, class r, at an occurrence k;

Functions $f(x_s^i)$, $f(x_s^j)$, $f(x_r^k)$ are embeddings extracted from the input matrices $x_s^i$, $x_s^j$ and $x_r^k$, respectively;

N is an ensemble of different classes of data in the training dataset;

n is the number of elements in ensemble N;

$N_s$ is the ensemble of occurrences of audio signals for class s;

$n_s$ is the number of elements in ensemble s;

$N_s\backslash i$ is the ensemble of occurrences of audio signals for class s except for occurrence i; and $\alpha_{trp}$ is a margin of error.

9. A non-transitory computer-readable recording medium in an electronic device for training a machine learning model to conduct authentication transactions, the non-transitory computer-readable recording medium storing instructions which when executed by a hardware processor cause the hardware processor to perform steps comprising:

obtaining a training dataset of audio signals, wherein each audio signal includes voice biometric data of a user and information for a secret passphrase spoken by the user and belongs to a same or different data class, each data class comprises a user identity and a passphrase identifier;

creating a feature matrix for each audio signal in each data class;

inputting the matrices into the machine learning model being trained, wherein the machine learning model being trained includes parameters;

calculating at least one embedding for each of the matrices;

calculating, by a machine learning algorithm using the embeddings, a loss for each data class and a second loss based on the losses for each data class;

updating the parameters of the machine learning model being trained based on the second loss; and in response to determining criteria defining an end of training have been satisfied, deeming the machine learning model to be operable for use in simultaneously successfully verifying the identity of a user based on voice biometric data and verifying a passphrase spoken by the user matches the secret passphrase of the user during authentication transactions.

10. The non-transitory computer-readable recording medium according to claim 9, wherein the instructions when read and executed by said hardware processor, cause said hardware processor to perform steps compromising calculating a metric loss, wherein the metric loss is a triplet loss, a contractive loss, or a prototypical loss.

11. The non-transitory computer-readable recording medium according to claim 9, wherein the instructions when read and executed by said processor, cause said hardware processor to repeatedly perform said creating, inputting, calculating at least one embedding, calculating the loss and the second loss, and updating steps until the criteria are satisfied.

12. The non-transitory computer-readable recording medium according to claim 9, wherein the instructions when read and executed by said processor, cause said hardware processor to perform steps compromising calculating the loss according to the equations $$L_s = \frac{1}{n_s(n_s - 1)} \sum_{i \in N_s} \sum_{j \in N_s \backslash i} \max\left(\left\| f\left(x_s^i\right) - f\left(x_s^j\right)\right\|_2^2 - \left\| f\left(x_s^i\right) - f\left(x_r^k\right)\right\|_2^2 + \alpha_{trp}, 0\right)$$

and

-continued $$L_{trp} = \frac{1}{n} \sum_s L_s$$

Where:

$L_{trp}$ is the triplet loss;

$L_s$ is the loss calculated separately for each class s;

Matrices $x_s^i$ and $x_s^j$ belong to the same class, class s, which means the user and the spoken passphrase for the matrices are the same;

Matrix $x_r^k$ belongs to a different class, class r, at an occurrence k;

Functions $f(x_s^i)$, $f(x_s^j)$, $f(_r^k)$ are embeddings extracted from the input matrices $x_s^i$, $x_s^j$ and $x_r^k$, respectively;

N is an ensemble of different classes of data in the training dataset;

n is the number of elements in ensemble N;

$N_s$ is the ensemble of occurrences of audio signals for class s;

$n_s$ is the number of elements in ensemble s;

$N_s \backslash i$ is the ensemble of occurrences of audio signals for class s except for occurrence i and $\alpha_{trp}$ is a margin of error.

\* \* \* \* \*